(12) United States Patent
Stoehr et al.

(10) Patent No.: US 8,660,768 B2
(45) Date of Patent: Feb. 25, 2014

(54) DEVICE FOR CONTROLLING THE DRIVING DYNAMICS OF A VEHICLE

(75) Inventors: Markus Stoehr, Stuttgart (DE);
Christian Huber, Munich (DE);
Michael Herges, Munich (DE); Oliver Jundt, Hessigheim (DE)

(73) Assignee: Knorr-Bremse Systeme fuer Nutzfahrzeuge, Munich (DE)

( * ) Notice: Subject to any disclaimer, the term of this patent is extended or adjusted under 35 U.S.C. 154(b) by 206 days.

(21) Appl. No.: 12/720,327

(22) Filed: Mar. 9, 2010

(65) Prior Publication Data
US 2010/0292903 A1 Nov. 18, 2010

(30) Foreign Application Priority Data
Mar. 19, 2009 (DE) .......................... 10 2009 013 895

(51) Int. Cl.
*B60W 10/22* (2006.01)
(52) U.S. Cl.
USPC ............................................. 701/70; 701/41
(58) Field of Classification Search
USPC ........... 701/70, 41, 30.3–30.9, 31.1, 31.2, 38,
701/42, 45; 180/400, 447, 441, 442, 422,
180/443
See application file for complete search history.

(56) References Cited

U.S. PATENT DOCUMENTS

| | | | | |
|---|---|---|---|---|
| 5,250,925 A * | 10/1993 | Shinkle | ........................ | 338/32 R |
| 5,842,143 A * | 11/1998 | Lohrenz et al. | .............. | 701/30.3 |
| 6,498,971 B2 * | 12/2002 | Leaphart | ......................... | 701/41 |
| 7,624,636 B2 * | 12/2009 | Bolzmann et al. | .............. | 73/509 |
| 7,840,324 B2 * | 11/2010 | Kato et al. | ....................... | 701/41 |
| 7,877,430 B2 * | 1/2011 | Wilson et al. | .................. | 708/319 |
| 2002/0029923 A1 * | 3/2002 | Tanioka | ......................... | 180/444 |
| 2005/0060082 A1 * | 3/2005 | Heuer et al. | .................... | 701/70 |
| 2005/0119811 A1 * | 6/2005 | Lim | ................................ | 701/41 |
| 2009/0188743 A1 * | 7/2009 | Ruetz | ............................ | 180/446 |
| 2010/0017066 A1 * | 1/2010 | Lu et al. | ......................... | 701/45 |
| 2010/0036557 A1 * | 2/2010 | Lu | .................................. | 701/29 |

FOREIGN PATENT DOCUMENTS

| | | |
|---|---|---|
| DE | 42 28 893 | 3/1994 |
| DE | 11 2005 003 289 | 11/2007 |
| EP | 0 557 917 | 9/1993 |
| EP | 0 922 618 | 6/1999 |
| JP | 2008-089 383 | 4/2008 |

OTHER PUBLICATIONS

German Patent and Mark Office, Translation of Examination Report, Nov. 2, 2009, from German Patent Application No. 10 2009 013 895.1 filed on Mar. 19, 20098.

\* cited by examiner

*Primary Examiner* — Marthe Marc-Coleman
(74) *Attorney, Agent, or Firm* — Kenyon & Kenyon LLP

(57) ABSTRACT

A device for controlling the driving dynamics of a vehicle, including at least one steering-angle sensor, one yaw-rate sensor, one acceleration sensor for measuring at least the transverse acceleration of the vehicle, as well as evaluation electronics for evaluating the signals supplied by the sensors, and for influencing a brake system and/or a drive of the vehicle as a function of the signals. According to the system, the steering-angle sensor, the yaw-rate sensor and the acceleration sensor are combined into one shared subassembly.

12 Claims, 1 Drawing Sheet

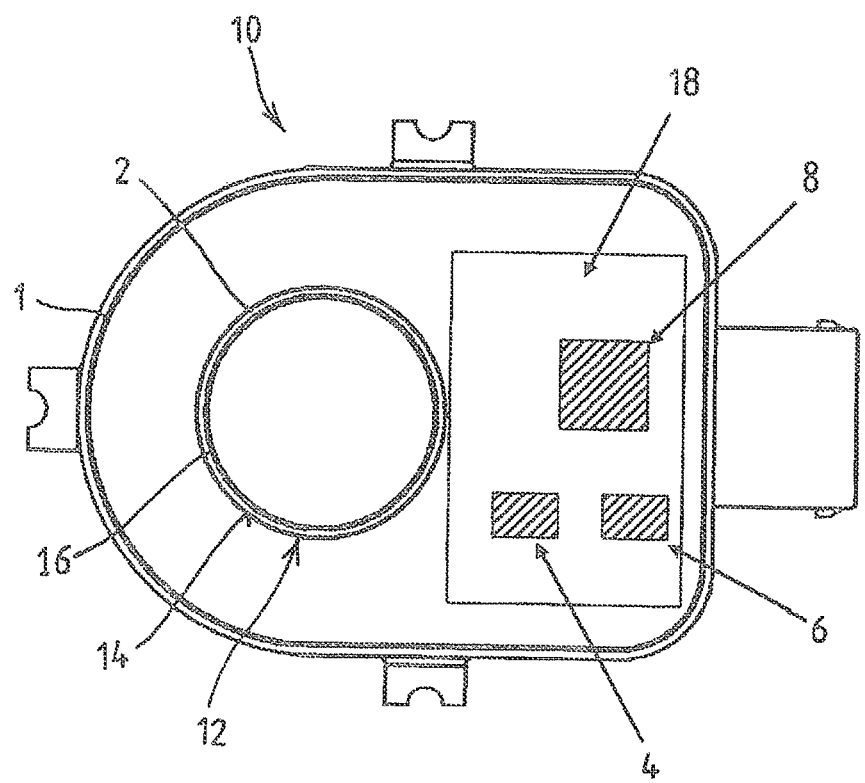

DEVICE FOR CONTROLLING THE DRIVING DYNAMICS OF A VEHICLE

RELATED APPLICATION INFORMATION

The present application claims priority to and the benefit of German patent application no. 10 2009 013 895.1, which was filed in Germany on Mar. 19, 2009, the disclosure of which is incorporated herein by reference.

FIELD OF THE INVENTION

The present invention is based on a device for controlling the driving dynamics of a vehicle.

BACKGROUND INFORMATION

An ESP system (electronic stability program) relates to the control of the vehicle behavior in the physical driving limits and is to influence the three degrees of freedom of the vehicle in the plane of the road (linear and lateral velocities and yaw velocity about the vertical axis) so that the vehicle handling is adapted to the driver command and the prevailing road surface conditions. In this respect it must first be determined how the vehicle is to behave (nominal behavior) in accordance with the driver command and how it actually behaves (actual behavior). In order to minimize the difference between nominal and actual behavior (system deviation), the tire forces must in some way be controlled by actuators.

The overall system shows the vehicle as controlled system, with sensors for defining the controller input variables, actuators for influencing the braking and motive forces, as well as the hierarchically structured controller, made up of the higher-level vehicle dynamics controller and lower-level slip controllers. The higher-level controller defines nominal values for the lower-level controller in the form of nominal slip. The "observer" determines the controlled state variable.

In order to determine the nominal behavior, the signals describing the driver's command of the steering-wheel angle sensor (desired steering), of the brake-pressure sensor (desired deceleration), and of the engine management (desired drive torque) are evaluated. In addition, the calculation of the nominal behavior also takes the vehicle speed into account, which is estimated from the signals of the wheel-speed sensors, the lateral-acceleration sensor, the yaw-rate sensor and the brake-pressure sensor. Depending on the system deviation, the yaw moment required to make the actual-state variables approach the nominal state variables is calculated.

In order to generate this nominal yaw moment, the vehicle dynamics controller determines the necessary changes in the nominal slip at the appropriate wheels. These are adjusted by the lower brake- and the drive-slip controllers together with the brake and engine actuators. Such an ESP system relies on known ABS and TCS components. The engine control unit having a CAN interface is able to set the required engine torque and thus the drive slip values at the wheels.

A generic device is disclosed in EP 0 922 618 B1. There, the yaw rate sensor and the transverse acceleration sensor are integrated in the electronic driving dynamics system. This results in certain advantages with regard to savings in connection with the wiring and housings.

In contrast, the exemplary embodiments and/or exemplary methods of the present invention is based on the objective of further developing a device of the type mentioned at the outset, to the effect that the integration degree is increased and specific advantages are obtained simultaneously as a result.

According to the exemplary embodiments and/or exemplary methods of the present invention, this objective is achieved by the features described herein.

SUMMARY OF THE INVENTION

According to a first aspect of the exemplary embodiments and/or exemplary methods of the present invention, at least the steering angle sensor and the yaw rate sensor are combined in a shared subassembly.

According to a further aspect of the exemplary embodiments and/or exemplary methods of the present invention, at least the steering-angle sensor and the acceleration sensor are combined in a shared subassembly.

Last but not least, the steering-angle sensor, the yaw-rate sensor and the acceleration sensor are combined in a shared subassembly.

This combination in one subassembly is accomplished by placing the sensors in close physical proximity to each other, for instance on a shared electronic circuit board.

Furthermore, at least one signal-conditioning electronic system for conditioning the measuring signals supplied by the sensors, such as an analog-digital converter may be integrated in the subassembly in an especially preferred manner, the signal-conditioning electronic system as well as the acceleration sensor and/or the yaw rate sensor being disposed on a shared circuit board, which is accommodated in a shared housing, which may be in the housing of the steering-angle sensor. The entire integrated subassembly may then be accommodated in the housing for the steering-angle sensor, which is provided anyway.

All sensors that are part of an ESP system of a vehicle, and also their signal-conditioning electronics are then housed in a single housing. This housing does not require any additional sealing measures against moisture or contaminants since it may be situated in a driver's cab or a driver or passenger compartment of the vehicle on account of the fact that the steering-angle sensor is installed on the steering column, so that it is protected from environmental influences. This also increases the reliability of the sensor system in an advantageous manner.

Furthermore, because of the higher degree of integration in comparison with the related art, the number of components is advantageously reduced because, for example, no more than one microcontroller for the sensor signal conditioning, one voltage controller, one ESD protection etc., will now be required.

Since the sensors for the signal transmission are usually connected to a vehicle data bus, the size of the cable tree and the number of plugs is reduced, which has an advantageous effect on the cost and the reliability.

If the steering-angle sensor and the angle-of-rotation sensor are combined in one shared subassembly, then the steering-angle signal and the yaw-rate signal available in a subassembly may be subjected to a plausibility check as to whether a particular steering angle and the current yaw rate of the vehicle constitute plausible values. To this end, the current value for the vehicle velocity is utilized as well, for instance by a CAN data bus.

The measures set forth in the dependent claims allow for advantageous further developments and improvements of the invention specified in the independent claims.

Since current vehicles usually allow for an adjustment of the steering column inclination in the longitudinal vehicle direction, in particular in the case of commercial vehicles, a yaw rate sensor installed in one subassembly together with the steering-angle sensor would supply incorrect measuring signals in a case where the steering column is set at an incline relative to the vehicle vertical. However, if the acceleration sensor advantageously is a three-axial sensor for detecting the acceleration in three directions running perpendicular to each other, then the current angular position of the yaw-rate sensor relative to the vertical is able to be determined from the three measured acceleration signals in the X, Y and Z-direction, and the measuring signal of the yaw-rate sensor can be corrected in such a way as if this measuring signal came from a yaw-rate sensor whose measuring direction had an exact vertical alignment.

Furthermore, the measuring direction of a single-axial acceleration sensor for measuring the transverse acceleration would have to be aligned exactly perpendicular with the longitudinal vehicle axis, which, however, is not always possible during the installation or possible only with greater tolerances.

Last but not least, in the framework of the exemplary embodiments and/or exemplary methods of the present invention an acceleration sensor measuring in three axes has the advantage over an acceleration sensor measuring in only one axis (transverse direction) that tilting movements or vibrations of the driver's cab due to a flexible suspension of the driver's cab on the frame provided in heavy commercial vehicles are able to be detected since they usually occur in all three directions and it can therefore be ruled out that the signals generated by the acceleration sensor in the measuring direction transversely to the longitudinal vehicle direction are attributable to cornering. Such signals solely due to vibrations of the driver's cab are then filtered out by the evaluation electronics and are not used as measured signals within the ESP system.

As an alternative, the yaw rate sensor could be a three-axial sensor for detecting the yaw rate in three directions running perpendicular to each other, because it is then possible to use the three measuring signals in the X, Y and Z-direction to determine or calculate the angle of the steering column in relation to the vehicle vertical, and thus also the yaw rate of the vehicle in relation to the vehicle vertical in the Z-direction.

As mentioned earlier already, the housing of the steering-angle sensor as the housing accommodating the subassembly does not require any additional sealing measures against moisture or contaminants since it is situated in the driver's cab or in the driver or passenger compartment of the vehicle due to the installation on the steering column, and is therefore protected from environmental effects.

As an alternative, the subassembly or the housing of the steering-angle sensor accommodating it could also be disposed outside of the driver or passenger compartment of the vehicle, e.g., in the region of the steering gear in which the steering column or the steering spindle terminates, in order to convert the rotary motion introduced via the steering wheel into a steering motion.

Since it cannot be ruled out in such a case that the housing of the subassembly will be exposed to contaminants and moisture, the housing of the subassembly may be developed in a manner that seals against the penetration of moisture and dirt. However, the advantage over the previously described alternative is that the wiring of the subassembly need not be routed via the hinged joints of the driver's cab and thus is not exposed to any movement, which advantageously increases the service life and reliability of the sensor wiring.

Furthermore, the exemplary embodiments and/or exemplary methods of the present invention relates to a vehicle which includes an afore-described device.

Further details are derived from the following description of an exemplary embodiment.

An exemplary embodiment of the present invention is illustrated in the drawing and explained in greater detail in the following description.

BRIEF DESCRIPTION OF THE DRAWING

The FIGURE shows a cross-sectional view of a subassembly made up of steering-angle sensor, yaw-rate sensor, acceleration sensor and signal-conditioning electronics inside the housing of the steering-angle sensor according to an exemplary embodiment of the present invention.

DETAILED DESCRIPTION

FIG. 1 shows a housing 1 of a steering-angle sensor 2, which is part of a device for controlling the driving dynamics of a vehicle, in this case, a commercial vehicle, in particular.

Furthermore, the device includes a yaw-rate sensor 4 and an acceleration sensor 6 for measuring at least the transverse acceleration of the vehicle, as well as signal-conditioning electronics 8 for conditioning the measuring signals provided by the sensors, in the form of a microcontroller, which, for example, converts the analog measuring signals from sensors 2, 4, 6 into digital signals in order to be able to then inject them into a CAN vehicle data bus (not shown here), from where the digitized signals are then forwarded to evaluation electronics, which influence a brake system and the drive of the vehicle as a function of these signals.

According to an exemplary embodiment, steering-angle sensor 2, yaw-rate sensor 4, acceleration sensor 6, and signal-conditioning electronics 8 may be combined in one shared subassembly 10 by accommodating these components or modules inside housing 1 of the steering-angle sensor. Housing 1 of steering-angle sensor 2 is provided on the steering column anyway in order to accommodate its signal-conditioning electronics as well as steering-angle sensor 2 itself in a protected manner.

As an alternative, however, yaw-rate sensor 4 and acceleration sensor 6 may be housed in a separate housing, which is then flange-mounted on housing 1 of steering-angle sensor 2, signal-conditioning electronics 8 in this case being situated either inside the separate housing or inside housing 1 of steering-angle sensor 2. Instead of a shared signal-conditioning electronics 8 for all sensors 2, 4, 6, each sensor 2, 4, 6 could also include its own signal-conditioning electronics, which are then also integrated in module 10 or in housing 1.

This housing has a feed-through opening 12 through which a steering column 14 projects, inside of which a steering spindle 16 which supports a steering wheel at its extremity is mounted so as to be rotatable. Steering-angle sensor 2 may be a magneto-resistive sensor having an annular toothed wheel, which encloses feed-through opening 12 and the sensor component turning together with steering spindle 16.

Signal-conditioning electronics 8 as well as acceleration sensor 6 and yaw-rate sensor 4 are disposed on a shared circuit board 18, whose circuit traces provide the necessary connections and which is accommodated in housing 1 for steering-angle sensor 2. The entire integrated subassembly 10 may then be situated or accommodated in this housing 1. Housing 1 of steering-angle sensor 2 may be situated directly underneath the steering wheel, which is supported by steering spindle 16 at the extremity.

The inclination of steering column 14 relative to the longitudinal vehicle direction is adjustable. Therefore, a yaw-rate sensor 4 installed together with steering-angle sensor 2 in one subassembly 10 would supply incorrect measuring signals if steering column 14 is set at an incline relative to the vehicle vertical. It therefore may be that acceleration sensor 6 may be a three-axial sensor for detecting the acceleration in three directions lying perpendicular to each other. The evaluation electronics may then be configured to determine the current angular position of yaw-rate sensor 4 relative to the vehicle vertical from the three measured acceleration signals in the X, Y and Z-direction, and to correct the measuring signal from yaw-rate sensor 4 in such a way that it exclusively describes the rotation of the vehicle about the vehicle vertical or the Z-direction.

As an alternative, yaw rate sensor 4 could be a three-axial sensor for detecting the yaw rate in three directions perpendicular to each other, because it is then possible to use the three measured signals in the X, Y and Z-direction to determine or calculate the angle of the steering column in relation to the vehicle vertical or Z-direction, and thus also determine or calculate the yaw rate of the vehicle in relation to the vehicle vertical in the Z-direction.

The List of Reference Numerals is as follows:
1 housing;
2 steering-angle sensor;
4 yaw rate sensor;
6 acceleration sensor;
8 signal-conditioning electronics;
10 subassembly;
12 feed-through opening;
14 steering column;
16 steering spindle; and
18 circuit board.

What is claimed is:

1. A device for controlling driving dynamics of a vehicle, comprising:
    at least one steering-angle sensor;
    at least one acceleration sensor to measure at least a transverse acceleration of the vehicle;
    at least one yaw-rate sensor; and
    an electronic evaluation arrangement to evaluate signals supplied by the at least one steering-angle sensor and the at least one yaw-rate sensor, and to influence at least one of (i) a brake system and (ii) a drive of the vehicle as a function of the signals, the electronic evaluation arrangement performing a plausibility check of the signals supplied by the at least one steering-angle sensor and the at least one yaw-rate sensor;
    wherein the at least one steering-angle sensor, the at least one acceleration sensor, and the at least one yaw-rate sensor are combined in one shared subassembly, so that it may be determined whether a particular steering angle and a current yaw rate of the vehicle constitute plausible values,
    wherein the subassembly is accommodated in a shared housing, which is for the at least one steering-angle sensor,
    wherein the housing is disposed one of (i) on a steering column of the vehicle, and (ii) around the steering column of the vehicle,
    wherein at least one electronic signal-conditioning arrangement to condition measuring signals supplied by the sensors is also integrated in the subassembly,
    wherein at least one of (i) the at least one electronic signal-conditioning arrangement, (ii) the acceleration sensor, and (iii) the yaw-rate sensor are disposed on a shared circuit board, which is disposed inside the shared housing of the subassembly, and
    wherein the plausibility check of the signals supplied by the at least one steering-angle sensor and the at least one yaw-rate sensor checks whether a particular steering angle and a current yaw rate of the vehicle constitute plausible values based on the vehicle velocity.

2. The device of claim 1, wherein the acceleration sensor is a three-axial sensor for detecting the acceleration in three directions lying perpendicular to each other.

3. The device of claim 1, wherein the yaw-rate sensor is a three-axial sensor for detecting the yaw rate in three directions lying perpendicular to each other.

4. The device of claim 1, wherein the housing is situated directly underneath a steering wheel disposed at an extremity of a steering spindle routed through the steering column.

5. The device of claim 1, wherein the housing is situated outside of one of a driver's cab and a passenger compartment of the vehicle and is sealed against penetration of moisture and contaminants.

6. The device of claim 1, wherein the at least one electronic signal-conditioning arrangement is an analog-digital converter.

7. The device of claim 1, wherein the at least one steering-angle sensor, the yaw-rate sensor, the acceleration sensor, and the electronic evaluation arrangement are connected by a data bus.

8. The device of claim 1, wherein the yaw-rate sensor and the acceleration sensor are three-axial sensors for detecting the yaw rate and the acceleration rate in three directions lying perpendicular to each other.

9. A vehicle, comprising:
    a device to control driving dynamics of the vehicle, including:
        at least one steering-angle sensor;
        at least one acceleration sensor to measure at least a transverse acceleration of the vehicle;
        at least one yaw-rate sensor; and
        an electronic evaluation arrangement to evaluate signals supplied by the at least one steering-angle sensor and the at least one yaw-rate sensor, and to influence at least one of (i) a brake system and (ii) a drive of the vehicle as a function of the signals, the electronic evaluation arrangement performing a plausibility check of the signals supplied by the at least one steering-angle sensor and the at least one yaw-rate sensor;
    wherein the at least one steering-angle sensor, the at least one acceleration sensor, and the at least one yaw-rate sensor are combined in one shared subassembly, so that it may be determined whether a particular steering angle and a current yaw rate of the vehicle constitute plausible values,
    wherein the subassembly is accommodated in a shared housing, which is for the at least one steering-angle sensor,
    wherein the housing is disposed one of (i) on a steering column of the vehicle, and (ii) around the steering column of the vehicle,
    wherein at least one electronic signal-conditioning arrangement to condition measuring signals supplied by the sensors is also integrated in the subassembly,
    wherein at least one of (i) the at least one electronic signal-conditioning arrangement, (ii) the acceleration sensor, and (iii) the yaw-rate sensor are disposed on a shared circuit board, which is disposed inside the shared housing of the subassembly, and
    wherein the plausibility check of the signals supplied by the at least one steering-angle sensor and the at least one yaw-rate sensor checks whether a particular steering angle and a current yaw rate of the vehicle constitute plausible values based on the vehicle velocity.

10. The vehicle of claim 9, wherein the at least one steering-angle sensor, the at least one yaw-rate sensor, and the electronic evaluation arrangement are connected by a data bus.

11. The device of claim 9, wherein the yaw-rate sensor is a three-axial sensor for detecting the yaw rate in three directions lying perpendicular to each other.

12. The vehicle of claim 9, wherein the yaw-rate sensor is a three-axial sensor for detecting the yaw rate in three directions lying perpendicular to each other, and wherein the acceleration sensor is a three-axial sensor for detecting the acceleration rate in three directions lying perpendicular to each other.

* * * * *